427-391 SR
7/9/86 XR RE 32,245

United States Patent [19]
Grenoble et al.

[11] E Patent Number: Re. 32,245
[45] Reissued Date of Patent: Sep. 9, 1986

[54] MULTI-COMPONENT SOLVENTLESS SILICONE RELEASE COATING SYSTEM

[75] Inventors: Maurice E. Grenoble, Ballston Lake; Richard P. Eckberg, Saratoga Springs, both of N.Y.

[73] Assignee: General Electric Company, Waterford, N.Y.

[21] Appl. No.: 706,206

[22] Filed: Feb. 25, 1985

Related U.S. Patent Documents

Reissue of:
[64] Patent No.: 4,448,815
Issued: May 15, 1984
Appl. No.: 4,58,,421
Filed: Jan. 17, 1983

[51] Int. Cl.[4] ..... B05D 3/02; C08L 83/07
[52] U.S. Cl. ..... 427/387; 427/391; 528/15; 528/20; 528/26; 528/32; 524/588; 524/861; 524/906; 525/477; 525/478; 525/479; 525/925; 525/939

[58] Field of Search ..... 427/387, 391; 528/15, 528/20, 26, 32; 524/588, 861, 906; 525/477, 478, 479, 925; 206/524.31

[56] References Cited

U.S. PATENT DOCUMENTS

| | | | |
|---|---|---|---|
| 3,676,420 | 7/1972 | Fulton | 524/906 X |
| 3,925,277 | 12/1975 | Lampe | 524/906 |
| 4,071,644 | 1/1978 | Grenoble | 427/302 |
| 4,124,560 | 11/1978 | Herzig | 524/906 X |
| 4,256,870 | 3/1981 | Eckberg | 528/15 |
| 4,262,107 | 4/1981 | Eckberg | 528/15 |
| 4,322,320 | 3/1982 | Caprino | 523/212 |
| 4,340,647 | 7/1982 | Eckberg | 428/429 |

*Primary Examiner*—Thurman K. Page

[57] ABSTRACT

The present invention provides a method for preparing a precious metal catalyzed, heat curable silicon release coating composition. Also, there is provided an article of manufacture for packaging the ingredients necessary to practice the method of the invention.

57 Claims, No Drawings

MULTI-COMPONENT SOLVENTLESS SILICONE RELEASE COATING SYSTEM

Matter enclosed in heavy brackets [ ] appears in the original patent but forms no part of this reissue specification; matter printed in italics indicates the additions made by reissue.

BACKGROUND OF THE INVENTION

The present invention relates to a method for providing heat cured, precious metal catalyzed, solventless silicone release coating compositions which have improved shelf-life and bath-life, require utilization of smaller quantities of precious metal catalyst and provide the end-user greater flexibility in formulating and preparing release coating baths which meet his specific needs. In addition, the present invention provides an article of manufacture useful for providing the ingredients necessary to practice the foregoing method.

An important advance in the art of silicone release coating compositions is the solventless release coating composition of Grenoble, described in U.S. Pat. No. 4,071,644. This composition includes a low viscosity vinyl chain-stopped polysiloxane or a low viscosity silanol terminated polysiloxane with an organohydrogensiloxane and a curing catalyst. Among the advantages of such a solventless release coating composition are that the need for expensive pollution control equipment is eliminated and the amount of energy required to effect curing is substantially reduced.

However, a problem relating to premature curing or gelation must be overcome in order to provide a commercially more desirable solventless release coating composition. A typical coating composition is provided as a two component system, one component containing a base polymer and catalyst and the other a cross-linking agent. When the two components are mixed together to provide a release coating bath, premature curing may result in a catalyzed bath having a pot-life insufficient to enable the end-user to carry out the coating application. One way of ameliorating these problems is to include an inhibitor in the component containing the base polymer and catalyst which is effective for retarding the cure reaction at ambient temperature but not at elevated temperatures.

One example of such an inhibitor containing release coating composition is disclosed in Eckberg, U.S. Pat. No. 4,256,870. This release coating composition comprises a base polymer such as a vinyl chain-stopped polydialkyl-alkylvinyl copolymer and a methylhydrogen cross-linking fluid. A platinum or platinum metal complex is provided to initiate an addition cure or hydrosilation reaction. An inhibitor selected from organic esters of maleic acid is added to the composition in order to selectively retard the cure reaction so as to provide adequate shelf-life and a workable pot-life for the coating composition.

Eckberg in U.S. Pat. No. 4,262,107 discloses a silicone rubber composition with a good shelf-life and fast curing at elevated temperatures comprising a silanol end-stopped diorganopolysiloxane polymer, a silicone hydride and a rhodium complex catalyst in combination with an inhibitor compound selected from low molecular weight silanol end-stopped diorganopolysiloxanes, certain acetylenic compounds, olefinic carboxylic acid esters of aliphatic alcohols such as vinyl acetate, alkenyl isocyanurates and mixtures of such inhibitor compounds.

In U.S. Pat. No. 4,347,346 Eckberg discloses a solventless platinum or rhodium catalyzed addition curable polyorganosiloxane release coating composition containing a dialkylacetylenedicarboxylate inhibitor for preventing premature gelation at ambient temperatures but which will cure at elevated temperatures via a hydrosilation reaction to form a coating capable of releasing materials from substrates which would normally adhere thereto.

A solventless silicone release coating composition containing a blend of a dialkylcarboxylic ester having carbon to carbon unsaturation and an olefinic carboxylic acid ester of an aliphatic alcohol which is effective for retarding a precious metal catalyzed addition cure hydrosilation reaction at room temperature, but which does not interfere with curing at elevated temperatures, is provided by Eckberg in Ser. No. 458,420, filed concurrently herewith. Generally such release coating composition comprises an olefinorganopolysiloxane or silanol terminated polysiloxane base polymer, an organohydrogenpolysiloxane cross-linking agent, a catalytic amount of a precious metal catalyst and an effective amount of a blend of a dialkylcarboxylic ester having carbon to carbon unsaturation and an olefinic carboxylic acid ester of an aliphatic alcohol for inhibiting an addition cure hydrosilation reaction between said base polymer and said cross-linking agent at room temperature, but which is not present in an amount sufficient to prevent curing of said coating composition at elevated temperatures. The ratio of dialkyl carboxylic ester to olefinic carboxylic acid ester of an aliphatic alcohol of the inhibitor blend ranges from approximately 1:24 to 1:1, but preferably is blended in a 1:3 ratio. The most preferred dialkyl carboxylic ester containing carbon to carbon unsaturation is diallylmaleate; however, other preferred compounds include butylallylmaleate, diallylsuccinate, dimethylmaleate, diethylmaleate and silylmaleates such as bis$\gamma$-propyltris (methoxy)silylmaleate. The most preferred olefinic carboxylic acid ester of an aliphatic alcohol is vinyl acetate; however, any compound derived from an aliphatic alcohol having 1 to 4 carbon atoms and an olefinic carboxylic acid having 2 to 10 carbon atoms is also effective. Ordinarily an effective amount of inhibitor ranges from approximately 0.05% to approximately 2% by weight and preferably from 0.1% to 1.5% by weight.

Although compositions such as the foregoing have improved shelf-life and pot-life, it is desirable to provide compositions and methods which still further improve such compositions' shelf-life and pot-life. Additionally, it is desirable to provide compositions and methods which utilize even smaller amounts of precious metal catalyst, further reduce the amount of energy required to effect a cure, and provide the end-user with greater flexibility in formulating and preparing release coating compositions which meet his specific needs. One such composition is provided by Eckberg in U.S. Pat. No. 4,340,647, which comprises a vinyl or silanol functional base polymer, a cross-linking agent containing silanic hydrogen, a precious metal catalyst such as platinum or rhodium, a carboxylic ester inhibitor, and a silicone vinyl gum cure accelerator effective for allowing thermal curing.

All of the foregoing disclosures are assigned to the same assignee as the present invention and are incorporated by reference into the instant disclosure.

Normal procedure for providing the end-user with a solventless release coating composition is to package the base polymer, catalyst and inhibitor in one package and to provide a second package containing the methylhydrogen cross-linking agent. The end-user produces a release coating composition bath by mixing the two packages according to specified proportions, whereupon such mixture is applied to a substrate such as paper and allowed to cure at elevated temperatures in a relatively short period of time.

Fabricators and formulators in the silicone industry have quickly recognized the significance of the foregoing silicone release coating compositions. It has become an industry standard to utilize such compositions in a two-package format at about a 100:5 mixture ratio. This system works quite well as evidenced by the success of the products in the market, but possesses certain disadvantages which are substantially overcome by the present invention.

The present invention provides a system for packaging and formulating silicone release coating compositions and an article of manufacture useful in such system. As a result, the shelf-life and pot-life are increased, energy and precious metal catalyst consumption are reduced, and flexibility in formulating baths to meet specific needs is provided. The two package prior art system effectively fixes the ratio of catalyst and inhibitor and thereby limits the end-user's flexibility. Not only does the three or more package system of the present invention provide such flexibility through the selective use of catalyst and inhibitor, it does so at effective catalyst levels which are lower and therefore more economical than those previously provided by the art.

A system simlar to that of the present invention is described by Caprino in U.S. Pat. No. 4,322,320. Caprino provides a process for formulating an addition cured silicone rubber composition comprising mixing 95 to 99.5 parts of Component A with 0.5 to 5.0 parts of Component B and 0.5 to 5.0 parts of Component C and curing said mixture. Component A is a silicone base compound consisting essentially of 100 parts by weight of a vinyl-containing linear polysiloxane and 0.5 to 50.0 parts by weight of a hydrogen-containing polysiloxane. Component B is a cure agent consisting essentially of 100 parts of said vinyl-containing polysiloxane containing therein at least 0.40 parts of an inhibitor compound having at least one radical of the formula —C—O—O—H, and at least 0.001 parts platinum per 100 parts vinyl polymer in Component B. Component C is a cure modifying agent consisting essentially of 100 parts of said vinyl-containing polysiloxane containing at least 0.10 parts of said inhibitor compound.

The present inventors are the first to recognize that by keeping each ingredient in a separate package improved results are obtained. That is, only the present inventors have recognized the need to keep the catalyst separate from the inhibitor and the base polymer, as well as the need to keep separate the base polymer and cross-linking agent in order to provide a release coating having improved shelf-life, extended workable pot-life and which utilizes substantially less precious metal catalyst than required in the prior art.

It is therefore an object of the present invention to provide a method for increasing the shelf-life and workable pot-life of a silicone release coating composition.

It is also an object of the present invention to provide a method for reducing the amount of precious metal catalyst utilized to initiate curing of a silicone release coating composition without sacrificing performance.

Another object of the present invention is to provide a method for enabling an end-user of a silicone release coating composition to more easily formulate and prepare a composition specific to his needs.

Still another object of the present invention is to provide an article of manufacture comprising a plurality of components which are mixed together to form a silicone release coating composition.

These and other objects will become apparent to those skilled in the art upon careful consideration of the following specification, examples and claims.

SUMMARY OF THE INVENTION

The process of the present invention provides a system for formulating an addition cured silicone release coating composition wherein specific proportions of each of three or more packages are mixed together, applied to a suitable substrate such as paper, and cured at elevated temperatures to provide a release coating such that materials do not adhere to the substrate which normally would adhere thereto. Component A is an olefinorganopolysiloxane or silanol chain-stopped polysiloxane base polymer. Component A can include any of the inhibitor compounds provided for in the prior art; however, the inhibitor blend disclosed by Eckberg, Ser. No. 458,420 and filed concurrently with the present invention, is preferred. It is even more preferable that such inhibitor be provided as a separate component or package so as to provide greater flexibility to the end-user in formulating a release composition which meets his specific needs. Component B is a precious metal catalyst in a suitable silicone fluid with sufficient catalyst present so as to afford approximately 25 ppm to 500 ppm in the blend. Component C is a polyorganohydrogen siloxane fluid, preferably polymethylhydrogen siloxane, cross-linking agent. Component D can be an inhibitor as described above, a vinyl gum cure accelerator, or other additive which further benefits the end-user. Of course, it is contemplated that any number of packages can be provided, for example component D can be an inhibitor and Component E can be a vinyl gum cure accelerator.

The article of manufacture of the present invention comprises the individual packages or components which contain the ingredients utilized in practicing the process of the present invention. That is, the article of manufacture comprises the combination of, for example, Component A, Component B, and Component C which are provided the end-user for mixing in specific proportions.

DESCRIPTION OF THE INVENTION

In accordance with the present invention there is provided a method for providing heat cured precious metal catalyzed solventless silicone release coating compositions which have improved shelf-life and bath-life, require utilization of small quantities of precious metal catalyst and provide the end-user greater flexibility in formulating and preparing release coating baths which meet his specific needs. Additionally, the present invention provides an article of manufacture useful for providing the ingredients necessary to practice the method of the present invention.

As discussed hereinabove, existing solventless silicone release coating compositions are provided to the end-user in a two part package. One part consists of an olefinorganopolysiloxane or a silanol end-stopped polysiloxane base polymer having therein a precious metal hydrosilation catalyst such as platinum or rhodium, and most often, an inhibitor compound for retarding curing at ambient temperature but which does not interfere with curing at elevated temperatures. The second package contains an organohydrogenpolysiloxane crosslinking agent, for example, trimethylsiloxy chain-stopped polymethylhydrogensiloxane. The end-user combines the two packages to form a release coating bath which is utilized to coat a suitable substrate. After thermally curing the coated substrate, there is provided a coating capable of releasing materials from the substrate which would normally adhere thereto. This system is useful for unsophisticated end-users, but most formulators now have a high degree of technical expertise and utilize very sophisticated equipment in preparing products for the marketplace. Accordingly, the present inventors developed a system which would provide end-users with greater flexibility in formulating release coating baths to meet their specific needs. Surprisingly, however, it was found that by providing the ingredients required for preparing a silicone release coating composition bath in separate packages, that in addition to obtaining flexibility there was also obtained increased shelf-life and bath-life, reduction of the amount of precious metal catalyst required to effect curing at relatively low temperatures, and reduction of the amount of energy consumed during curing.

The process of the present invention provides these benefits and overcomes many of the disadvantages of the prior art two-package sustem through utilization of a three or more package system. In the process of the present invention it is preferable that each component or package contain only one of the ingredients necessary to provide a silicone release coating composition; however, as described more fully hereinbelow, certain of the ingredients can be mixed together without adversely affecting shelf-life, bath-life, or the amount of precious metal catalyst required.

Package or Component A contains a base polymer which can be either an olefinorganopolysiloxane having structural units of the formula:

$$R_aR_b^1SiO_{\frac{(4-a-b)}{2}} \quad (I)$$

or a silanol end-stopped organopolysiloxane having the general formula:

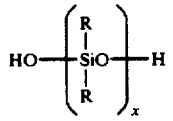

(IA)

wherein R is an organic radical selected from alkyl radicals such as methyl, ethyl, propyl, isopropyl, butyl, octyl, dodecyl and the like; cycloalkyl radicals such as cyclopentyl, cyclohexyl, cycloheptyl and the like, aryl radicals such as phenyl, naphthyl, tolyl, xylyl and the like, aralkyl radicals such as phenylethyl, phenylpropyl and the like; halogenated derivatives of the aforesaid radicals including chloromethyl, trifluoromethyl, chloroproply, chlorophenyl, dibromophenyl, tetrachlorophenyl, difluorophenyl and the like, and cyanoalkyl radicals such as beta-cyanoethyl, gamma-cyanopropyl, beta-cyanopropyl and the like. Preferably R is methyl; however, the above formulas are intended to cover any of the foregoing radicals or mixtures thereof. Among the radicals represented by $R^1$ are included alkenyl radicals such as vinyl, allyl, methallyl, butynyl, pentynyl and the like. Preferably $R^1$ is a vinyl or allyl and most preferably is vinyl.

Although the base polymer of Component A can be either an olefinorganopolysiloxane or a silanol end-stopped polysiloxane, it is most preferable that an olefinorganopolysiloxane be utilized. The olefinorganopolysiloxanes encompassed within the scope of Formula I are well known in the art, for example, as disclosed in U.S. Pat. Nos. 3,344,111 to Chalk and 3,436,366 to Modic, both of which are incorporated herein by reference. Similarly, their preparation and commercial availability are also well known. The olefinorganopolysiloxanes of Formula I can be characterized as copolymers of (1) siloxane units having the formula:

$$R_cR_d^1SI_{\frac{(4-c-d)}{2}} \quad (IV)$$

where R and $R^1$ are as defined above and c has a value of from 0 to 2 inclusive and the average sum of c and d is equal to from 0.8 to 3.0 inclusive, and (2) organopolysiloxane units having the structural formula:

$$(R)_nSiO_{\frac{4-n}{2}} \quad (V)$$

where R is as defined above and n has a value of from 0.8 to 2.5 inclusive. Thus, where the olefinorganopolysiloxane employed herein is a copolymer of units within the scope of Formula IV and an organopolysiloxane having an average formula within the scope of Formula V, the copolymer generally contains from 0.5 to 99.5 mole percent of the units of Formula IV and from 0.5 to 99.5 mole percent of units within the scope of Formula V. The preparation of these copolymers is well known to those skilled in the art.

A major proportion of the composition is typically a vinyl chain-stopped polysiloxane having the general formula:

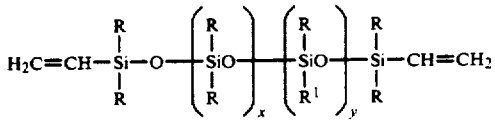

wherein R is a monovalent hydrocarbon radical free of unsaturation. Suitable radicals for R include, for example, methyl, ethyl, propyl, butyl and other similar unsaturated hydrocarbons, but ordinarily would not include phenyl groups for paper release purposes. $R^1$ is a hydrocarbon radical having alkenyl unsaturation. Typically $R^1$ represents vinyl groups but may also represent allylic or cycloalkenyl unsaturated groups; x and y are positive integers such that the vinyl chain-stopped polysiloxane has up to approximately 20% by weight of $R^1$ groups. The viscosity of such a polysiloxane ranges from approximately 50 to approximately 100,000 centipoise at 25° C. Preferably the vinyl chain-stopped polysiloxane has up to approximately 20% by weight of vinyl groups and the viscosity ranges from approximately 300 to approximately 550 centipoise at 25° C. The preferred vinyl chain-stopped polysiloxane has the general formula:

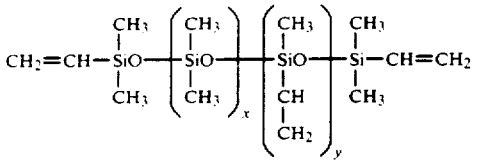

wherein x and y are as described above.

The silanol end-stopped polysiloxanes of Formula Ia are prepared by the equilibration of cyclic polysiloxanes with an alkali metal hydroxide catalyst. The desired viscosity is obtained by controlling the amount of water added to the reaction. These procedures are described in the literature and are well known to those skilled in the art.

Component B contains a precious metal catalyst effective for initiating a hydrosilation cure reaction. The precious metal catalyst component utilized in compositions of the present invention includes all of the well known platinum and rhodium catalysts which are effective for catalyzing the reaction between silicon-bonded hydrogen atoms and silicon-bonded olefinic groups, and which are freely miscible in solvent-free silicone polymers. These materials especially include the platinum hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,9436 to Modic are also useful herein. All of the aforesaid U.S. patents are incorporated by reference into the present disclosure.

A particularly useful catalyst for facilitating the hydrosilation reaction is the Karstedt catalyst described in U.S. Pat. No. 3,814,730. Other platinum metal catalysts can be utilized in the practice of the present invention; however, their selection depends upon such factors as the required reaction rate, expense, useful pot-life and the temperature at which the cure reaction is to take place. Other metal catalysts useful in the present invention include those which are silicone soluble complexes of the metals rhodium, ruthenium, palladium, osmium, iridium and platinum. For coating compositions of the present invention, the amount of catalyst ranges from approximately 10 to approximately 500 ppm (as weight of metal atoms), again depending on such factors as speed of reaction and cost requirements. Preferably, the amount of catalyst is approximately 10 to 150 ppm of the precious metal.

Component or Package C is a methylhydrogen fluid utilized by those skilled in the art as a cross-linking agent for addition-cure silicone systems. Particularly useful as a cross-linking agent for the present invention is a trimethyl chain-stopped polymethylhydrogen siloxane fluid having from approximately 10% to approximately 100% SiH groups, any remaining groups being dimethylsiloxy units, and having a viscosity in the range of from approximately 10 to 1000 centipoise at 25° C. However, any organohydrogenpolysiloxane having the general formula:

$$R_aH_bSiO_{\frac{(4-a-b)}{2}} \qquad \text{(II)}$$

is within the scope of the present invention.

The organohydrogenpolysiloxanes having structural units represented by Formula II hereinabove are intended to broadly cover fluid organopolysiloxanes which are preferably, but not necessarily, free of olefinic unsaturation, but which do contain silanic hydrogen. The organohydrogenpolysiloxanes represented by Formula II are also well known in the art, for example, as described in U.S. Pat. Nos. 3,344,111 and 3,436,366.

Among the radicals included within R of Formula II are alkyl, such as methyl, ethyl, propyl, isopropyl, butyl, octyl and the like; cycloalkyl, such as cyclopentyl, cyclohexyl, cycloheptyl and the like; aryl, such as phenyl, naphthyl, tolyl, xylyl and the like; aralkyl, such as phenylethyl, phenylpropyl and the like; halogenated derivatives of the above radicals, including chloromethyl, trifluoromethyl, chloropropyl, chlorophenyl, dibromophenyl, tetrachlorophenyl, difluorophenyl and the like; and cyanoalkyl, such as betacyanoethyl, gamma-cyanopropyl, beta-cyanopropyl and the like. Also intended to be included within the scope of Formula II are those materials where R is a mixture of the aforesaid radicals. Preferably the R group of Formula II is methyl.

Materials specifically encompassed within Formula II hereinabove include 1,3-dimethyldisiloxane and 1,1,3,3-tetramethyldisiloxane, as well as higher polymers containing up to 100,000 or more silicon atoms per molecule. Also included within the scope of Formula II are cyclic materials such as cyclic polymers of methylhydrogen siloxane having the general formula:

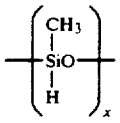

wherein x is a whole number equal to from 3 to 10 or more. Particularly included is sym-tetramethylcyclotetrasiloxane.

The organohydrogenpolysiloxanes employed in the practice of the present invention can also be characterized as copolymers containing at least one unit per molecule having the formula:

$$R_cH_dSiO_{\frac{(4-c-d)}{2}} \qquad \text{(VI)}$$

with the remaining siloxane units of the organopolysiloxane being within the scope of Formula V hereinabove, where R, c, d, and n are as defined above.

Within the scope of Formula VI are siloxane units such as hydrogen siloxane units $(HSiO)_{1.5}$, methyl hydrogen siloxane units $(HSiCH_3O)$, dimethyl hydrogen siloxane units $(HSi[CH_3]_2O)_{0.5}$, and dihydrogen siloxane units $(H_2SiO)$. In these copolymers, the siloxane units of Formulae V and VI are present in proportions so as to form a hydrogen polysiloxane within the scope of Formula II hereinabove. In general such copolymers contain from 0.5 to 99.5 mole percent of siloxane units of Formula V and from 0.5 to 99.5 mole percent of siloxane units of Formula VI.

Ordinarily for releasing coating purposes it is preferred that the organohydrogenpolysiloxane crosslinker be essentially a trimethyl chain-stopped methylhydrogenpolysiloxane fluid having a viscosity of approximately 10 to 500 centipoise at 25° C. and a hydrogen content of from approximately 0.1 to 1.67 percent by weight.

Each of Component A, Component B and Component C are essential for practicing the method of the present invention, and basically comprise the ingredients disclosed by Grenoble in U.S. Pat. No. 4,071,644 for a solventless silicone release coating composition. In the present invention, however, the respective components are provided the end-user in the form of an article of manufacture having each of the components separately packaged. Such separate packaging provides the surprising benefits of the present invention such as increased shelf-life, increased workable pot-life and reduction in the amount of precious metal catalyst required to initiate curing. It is to be emphasized that to come within the scope of the present invention, Components A, B and C must be separately packaged. However, additional ingredients such as an inhibitor or cure accelerator may be provided either as a separate component or as a part of another component and still come within the scope of the present invention.

Preferably there is also included a Component D which contains an inhibitor effective for retarding curing or crosslinking at ambient temperatures, but which does not interfere with curing at elevated temperatures. Although it is preferred that the inhibitor be provided as a separate component, it is within the scope of the present invention if such inhibitor is included with either the base polymer or cross-linking agent. However, the inhibitor should not be packaged with the precious metal catalyst as it is believed that when the inhibitor and catalyst are mixed, the inhibitor forms a complex with the metal atoms of the catalyst which becomes more stable and less reactive the longer the storage period before use. Accordingly, such packaging would result in substantial lessening of the benefits obtained by the present invention.

Eckberg in U.S. Pat. Nos. 4,256,870, 4,262,107 and 4,347,346 and in Ser. No. 458,420, all of which are incorporated herein by reference, discloses a variety of inhibitors which have been found useful in silicone release coating compositions. U.S. Pat. No. 4,256,870 discloses that an amount of dialkyl carboxylic ester containing carbon to carbon unsaturation is effective to inhibit the precious metal catalyzed hydrosilation cure reaction at temperatures below the heat cure temperature of the release coating composition. Most preferably such dialkyl carboxylic ester is diallylmaleate which has the formula:

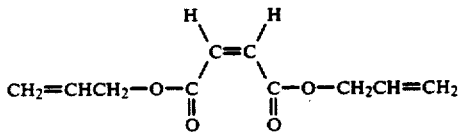

and ordinarily is utilized in a range of from approximately 0.1% to approximately 0.5% by weight. Other preferred diallylic carboxylic esters which are preferred include diallylphthalate and diallylsuccinate. Also, saturated dialkyl esters of maleic acid, such as diethyl and dimethyl maleate, and mixed esters such as butylallylmaleate or methylethylmaleate are useful as hydrosilation inhibitors for solventless release coating compositions.

The use of an olefinic carboxylic acid ester of an aliphatic alcohol is disclosed by Eckberg as an inhibitor for rhodium catalyzed silicone rubber compositions in U.S. Pat. No. 4,262,107. Therein it is taught that such compositions can be utilized at low concentrations, such as from 0.1 to 2 parts per 100 parts of the silanol base polymer, but preferably should be utilized in a concentration of 0.5 to 5 parts per 100 parts of the silanol base polymer. The preferred inhibitor compound is vinyl acetate; however, those olefinic carboxylic acid esters of an aliphatic alcohol wherein the alcohol has from 1 to 4 carbon atom and the olefinic carboxylic acid has from 2 to 10 carbon atoms are within the scope of the disclosure.

U.S. Pat. No. 4,347,346 discloses that dialkylacetylenedicarboxylates are effective inhibitors for preventing premature gelation at ambient temperatures and which do not interfere with curing at elevated temperatures.

The most preferred inhibitor is that disclosed in Ser. No. 458,420, filed on the same date and assigned to the same assignee as the present invention. Generally, the invention of Ser. No. 458,420 is based on the surprising discovery that a blend of a dialkyl carboxylic ester containing carbon to carbon unsaturation and an olefinic carboxylic acid ester of an aliphatic alcohol results in a blend which is a more effective inhibitor than utilizing similar amounts of the individual compounds, that is, a synergistic effect is obtained by such a blend of inhibitors.

The most preferred dialkyl carboxylic ester containing carbon to carbon unsaturation is diallylmaleate; however, any of the inhibitor compositions within the scope of U.S. Pat. No. 4,256,870 can also be utilized. Among the preferred inhibitor compositions which also can be utilized are butylallylmaleate, diallylsuccinate, dimethylmaleate, diethylmaleate and silylmaleates such as bis γ-propyltris(methoxy)silylmaleate which has the formula:

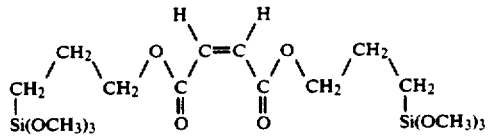

The most preferred olefinic carboxylic acid ester of an aliphatic alcohol is vinyl acetate; however, any inhibitor compound within the scope of U.S. Pat. No. 4,262,107 may also be utilized. More particularly, such compounds are those derived from an aliphatic alcohol having 1 to 4 carbon atoms and an olefinic carboxylic acid having from 2 to 10 carbon atoms.

The dialkyl carboxylic ester having carbon to carbon unsaturation, preferably diallylmaleate or butylallylmaleate, is blended with the olefinic carboxylic acid ester of an aliphatic alcohol, preferably vinyl acetate, in a ratio ranging from approximately 1:24 to 1:1, but most preferably is blended in approximately a 1:3 ratio. Accordingly, the most preferred inhibitor for the release coating composition is a blend comprising 1 parts diallylmaleate and 3 parts vinyl acetate.

Ser. No. 458,420 teaches that small amounts of such a two-part inhibitor permit exceptionally long catalyzed pot-life without sacrifice of cure performance, especially in compositions having a high platinum content. Ordinarily the effective amount of inhibitor ranges from approximately 0.05 to approximately 2% by weight, and preferably from 0.1 to 0.5% by weight. Use of such two-part inhibitor results in improved pot-life, yet the composition rapidly cures to a smear-free and migration-free nonadherent surface when thermally cured.

Another optional ingredient is a vinyl gum cure accelerator of the type disclosed by Eckberg in U.S. Pat. No. 4,340,647, which is assigned to the same assignee as the present invention and incorporated herein by reference. Therein it is disclosed that a dimethylvinyl chain-stopped polydimethylmethylvinylsiloxane polymer gum will accelerate the hydrosilation cure reaction at a relatively low temperature without sacrificing performance. Such vinyl gum cure accelerator may be provided as Component E of the article of manufacture of the present invention. However, it is preferable that such cure accelerator be provided in the same package as the base polymer.

What is disclosed and claimed by the present invention is a basic system for producing a silicone release coating composition and an article of manufacture for providing the ingredients necessary to formulate such release coating composition. The article of manufacture includes at least three components or packages, but may contain more, depending on whether optional ingredients are provided in a separate package or mixed with the ingredients of another package.

Use of the article of manufacture of the present invention for providing the ingredients utilized in the method of the present invention results in improved shelf-life, bath-life, reduction in the amount of precious metal catalyst required to initiate curing, and greater flexibility in formulating a bath to meet specific end-user requirements.

In order that those skilled in the art might be better able to practice the present invention, the following examples are given by way of illustration and not by way of limitation.

EXAMPLES 1 TO 6

In the following examples, release coating compositions were prepared from the following ingredients:

(A) a mixture consisting of 100 parts of a linear dimethylvinyl chain-stopped polydimethylsiloxane fluid having a viscosity of 120 cps at 25° C. and 5 parts of a dimethylvinyl chain-stopped linear polydimethylmethylvinylsiloxane copolymer gum having a molecular weight of approximately 300,000 and containing 0.2 mole percent methylvinyl siloxane units, such mixture having a viscosity of approximately 400 cps at 25° C.;

(B) a solution of a platinum catalyst in a dimethylvinyl end-stopped polydimethylsiloxane fluid having a viscosity of 300 cps at 25° C., there being sufficient catalyst present to afford 1800 ppm platinum (as metal) in the solution;

(C) a trimethylsiloxy chain-stopped linear polymethylhydrogensiloxane fluid having a viscosity of approximately 15 to 40 cps at 25° C. as a cross-linking agent; and (D) a blend of 3 parts vinyl acetate to 1 part of diallylmaleate.

Silicone release coating composition baths were prepared by mixing the four components as described in Table I. It should be noted that the inhibitor is provided as Component D and the vinyl gum cure accelerator is included with the base polymer in Component A. All parts are by weight.

TABLE I

| Coating Bath | Parts A | Parts B | Parts C | Parts D |
|---|---|---|---|---|
| Example 1 | 100 | 8.4 | 4.4 | 1.2 |
| Example 2 | 100 | 6.1 | 4.3 | 0.87 |
| Example 3 | 100 | 3.7 | 4.2 | 0.53 |
| Example 4 | 100 | 1.4 | 4.1 | 0.2 |

It can be seen that the relative ratio of catalyst (part B) to inhibitor (part D) was maintained at approximately 7:1 in all four baths. The silicone release coating compositions of Examples 1 to 4 were coated onto 40 pound super calendered Kraft (SCK) substrate on an 18 inch three roll offset gravure pilot coater equipped with forced air ovens. Depositions of 0.5 to 0.7 pounds per 3000 square feet were measured. The oven dwell time required for cure to smear and migration-free abhesive surface was determined for each coating bath as a function of oven temperature. No significant increase in viscosity (that is, the coating characteristics were not altered) over an eight hour period was observed for any of the formulations. Cure performance for the four new coating baths is shown in Table II along with previously determined results of prior art, high and low catalyst concentration, two component compositions (Examples 5 and 6).

TABLE II

| | | Oven Dwell Time for Cure, Seconds | | | | | |
|---|---|---|---|---|---|---|---|
| Coating Bath | ppm Pt | 200° F. | 250° F. | 300° F. | 350° F. | 400° F. | 450° F. |
| Example 1 | 151 | 26 | 9 | 3 | 2 | 1.5 | 1 |
| Example 2 | 110 | 26 | 9 | 3 | 2 | 1.5 | 1 |
| Example 3 | 67 | NC | 18 | 9 | 4 | 2.0 | — |
| Example 4 | 25 | NC | NC | 18 | 5 | 2.0 | — |
| Example 5 | 150 | 26 | 9 | 3 | 2 | 1.5 | 1 |
| Example 6 | 25 | NC | NC | 18 | 10 | 5.0 | 3 |

Note:
NC = No Cure

The results shown in Table II illustrate the versatility of the multi-component system of the present invention and the improvement over the prior art. Premium performance solventless products of the type utilized in Example 5 rely on high concentrations of platinum catalyst to allow cure at oven temperatures as low as 200° F. (93° C.). It can be seen that the cure performance of Example 2 was indistinguishable from that of Example 1 and Example 5 despite the fact that it contained only 73% as much platinum catalyst. Thus, the instant invention offers the same low temperature cure performance as prior art two component compositions but at a substantially reduced cost because of more efficient use of the precious metal catalyst.

Additionally, a comparison of the cure time versus temperature for Example 4 and Example 6, both of which contain similar low concentrations of catalyst, reveals enhanced performance even with platinum catalyst levels of 25 ppm. This is most clear at 350° F. where the composition made according to the method of the present invention cured in 5 seconds whereas a substantially identical two part prior art composition required 10 seconds to cure. Such faster cure translates into higher line speed and thus lower per unit cost for end-users.

I claim:

1. A process for providing a substrate having a silicone release coating composition cured thereon comprising the steps of:

(a) mixing 100 parts by weight or Component A with 5 to 100 parts of Component B and 3 to 10 parts of Component C, wherein Component A is an olefinorganopolysiloxane or a silanol end-stopped organopolysiloxane base polymer, Component B is a precious metal or precious metal complex catalyst dispersed in a vinyl silicone fluid; and Component C is an organohydrogenpolysiloxane cross-linking agent, wherein Component A and/or Component C further includes an amount of inhibitor effective for retarding a hydrosilation cure reaction at ambient temperature but which does not interfere with such reaction at elevated temperatures and wherein prior to use Component A, Component B and Component C are stored in separate containers;

(b) applying a coating of the mixture comprising Component A, Component B and Component C to a suitable substrate; and (c) curing said coating to said substrate.

2. The process of claim 1 wherein the base polymer is an olefinorganopolysiloxane having structural units of the formula:

$$R_aR_b^1SiO_{\frac{(4-a-b)}{2}}$$

or a silanol end-stopped organosiloxane having the general formula:

$$HO\left(\begin{matrix}R\\SiO\\R\end{matrix}\right)_x H$$

wherein R is an organic radical attached to silicon by a C-Si linkage and is selected from the group consisting of monovalent hydrocarbon radicals, halogenated monovalent hydrocarbon radicals, and cyanoalkyl radicals and mixtures thereof, and which has from 1 to 30 carbon atoms; $R^1$ is an olefinic hydrocarbon radical having from 1 to 20 carbon atoms, a has a value ranging from 0 to 3 inclusive, b has a value ranging from about 0.005 to about 2.0 inclusive, and the sum of a and b equals 0.8 to 3 inclusive, and the olefinorganosiloxane has a viscosity ranging from approximately 10 centipoise to approximately 5000 centipoise at 25° C., and x is such that the viscosity of the silanol end-stopped polysiloxane has a viscosity between approximately 10 centipoise and approximately 5000 centipoise at 25° C.

3. The process of claim 1 wherein the organohydrogenpolysiloxane cross-linking agent has structural units of the formula:

$$R_aH_bSiO_{\frac{(4-a-b)}{2}}$$

wherein R is an organic radical selected from the group consisting of monovalent hydrocarbon radicals, halogeneated monovalent hydrocarbon radicals and cyanoalkyl radicals and mixtures thereof and which has from 1 to 30 carbon atoms, a has a value ranging from 0 to 3 inclusive, b has a value ranging from about 0.005 to about 2.0 inclusive, and the sum of a and b equals 0.8 to 3 inclusive, and wherein the viscosity ranges from approximately 10 to 500 centipoise at 25° C.

4. The process of claim 2 wherein R is methyl.

5. The process of claim 3 wherein R is methyl.

6. The process of claim 2 wherein $R^1$ is vinyl or allyl.

7. The process of claim 1 wherein the olefinorganopolysiloxane is a dimethylvinyl chain-stopped dimethylmethylvinylpolysiloxane copolymer fluid having a viscosity of approximately 100 to 1000 centipoise at 25° C. and a vinyl content of up to 2.5 weight percent.

8. The process of claim 1 wherein the organohydrogenpolysiloxane is a trimethyl chain-stopped methylhydrogenpolysiloxane fluid having a viscosity of approximately 10 to 500 centipoise at 25° C. and a hydrogen content of approximately 0.1 to 1.67 percent by weight.

9. The process of claim 1 wherein the precious metal catalyst is selected from the group consisting of platinum metal, rhodium metal, complexes of platinum metal and complexes of rhodium metal.

10. The process of claim 9 wherein the precious metal catalyst is present in an amount sufficient to provide approximately 5 to 500 parts of platinum or rhodium metal per million parts of base polymer.

11. The process of claim 1 wherein the inhibitor is provided as Component D, further comprising mixing 0.1 to 5 parts of Component D with 100 parts of a mixture of Component A, Component B and Component C.

12. The process of claim 11 wherein the inhibitor is selected from the class consisting of dialkyl carboxylic esters containing carbon to carbon unsaturation, compounds containing an acetylenic group, olefinic carboxylic acid esters of aliphatic alcohols where the aliphatic alcohol contains from 1 to 4 carbon atoms and the olefinic carboxylic acid contains from 2 to 10 carbon atoms, alkenyl isocyanurates wherein the alkenyl group contains from 3 to 8 carbon atoms, dialkylacetylenedicarboxylates, and a blend of a dialkylcarboxylic ester having carbon to carbon unsaturation with an olefinic carboxylic acid ester of an aliphatic alcohol where the aliphatic alcohol contains from 1 to 4 carbon atoms and the olefinic carboxylic acid contains from 2 to 10 carbon atoms.

13. The process of claim 11 wherein the inhibitor is a blend of a dialkylcarboxylic ester having carbon to carbon unsaturation and an olefinic carboxylic acid ester of an aliphatic alcohol, where the aliphatic alcohol contains from 1 to 4 carbon atoms and the olefinic carboxylic acid contains from 2 to 10 carbon atoms.

14. The process of claim 13 wherein the dialkylcarboxylic ester is selected from the group consisting of diallylmaleate, butylallylmaleate, diallylsuccinate and dialkyl esters of maleic acid selected from the group consisting of dimethylmaleate, diethylmaleate and silylmaleate.

15. The process of claim 13 wherein the olefinic carboxylic acid ester of an aliphatic alcohol is vinyl acetate.

16. The process of claim 13 wherein the dialkyl carboxylic ester is blended with the olefinic carboxylic acid ester of an aliphatic alcohol in a ratio of from approximately 1:24 to approximately 1:1.

17. The process of claim 13 wherein the dialkyl carboxylic ester is blended with the olefinic carboxylic acid ester of an aliphatic alcohol in a ratio of approximately 1 to 3.

18. The process of claim 13 wherein diallylmaleate is blended with vinyl acetate in a ratio of approximately 1 to 3.

19. The process of claim 11 wherein there is sufficient inhibitor present in Component D so as to be present in the mixture in an amount ranging from approximately 0.05 to 2 percent by weight.

20. The process of claim 1 further comprising mixing 0.1 to 10 parts of Component E with 100 parts of a mixture of Component A, Component B and Component C, wherein Component E is a vinyl gum cure accelerator effective for accelerating the cure of said addition curable release coating composition and wherein said gum has an average molecular weight of approximately 200,000 to 400,000.

21. The process of claim 20 wherein said gum is present in the mixture in the amount of at least 0.5 weight percent of said addition curable release coating compositions.

22. An article of manufacture comprising:

(a) 100 parts by weight of Component A, (b) 5 to 100 parts by weight of Component B, and (c) 3 to 10 parts by weight of Component C, wherein Component A is an olefinorganopolysiloxane or a silanol end-stopped organopolysiloxane base polymer, Component B is a precious metal or precious metal complex catalyst dispersed in a vinyl silicone fluid, and Component C is an organohydrogenpolysiloxane cross-linking agent; wherein Component A and/or Component C further includes an amount of inhibitor effective for retarding a hydrosilation cure reaction at ambient temperature but does not interfere with such reaction at elevated temperatures and wherein Component A, Component B and Component C are contained separate from one another.

23. The article of manufacture of claim 22 wherein the base polymer is an olefinorganopolysiloxane having structural units of formula:

$$R_aR_b^1SiO_{\frac{(4-a-b)}{2}}$$

or is a silanol end-stopped organosiloxane having the general formula:

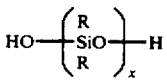

wherein R is or organic radical attached to silicon by a C-Si linkage and is selected from the group consisting of monovalent hydrocarbon radicals, halogenated monovalent hydrocarbon radicals, and cyanoalkyl radicals and mixtures thereof, and which has from 1 to 30 carbon atoms; $R^1$ is an olefinic hydrocarbon radical having from 1 to 20 carbon atoms, a has a value ranging from 0 to 3 inclusive, b has a value ranging from about 0.005 to about 2.0 inclusive, and the sum of a and b equals 0.8 to 3 inclusive, and the olefinorganopolysiloane has a viscosity ranging from approximately 10 centipoise to approximately 5000 centipoise at 25° C., and x is such that the viscosity of the silanol end-stopped polysiloxane has a viscosity between approximately 10 centipoise and approximately 5000 centipoise at 25° C.

24. The article of manufacture of claim 22 wherein the organohydrogenpolysiloxane cross-linking agent has structural units of the formula:

$$R_aH_bSiO_{\frac{(4-a-b)}{2}}$$

wherein R is an organic radical selected from the group consisting of monovalent hydrocarbon radicals, halogenated monovalent hydrocarbon radicals and cyanoalkyl radicals and mixtures thereof and which has from 1 to 30 carbon atoms, a has a value ranging from 0 to 3 inclusive, b has a value ranging from about 0.005 to about 2.0 inclusive and the sum of a and b equals 0.8 to 3 inclusive and wherein the viscosity ranges from approximately 10 to 5000 centipoise at 25° C.

25. The article of manufacture of claim 23 wherein R is methyl.

26. The article of manufacture of claim 24 wherein R is methyl.

27. The article of claim 23 wherein $R^1$ is vinyl or allyl.

28. The article of manufacture of claim 22 wherein the olefinorganopolysiloxane is a dimethylvinyl chain-stopped dimethylmethylvinylpolysiloxane copolymer fluid having a viscosity of approximately 100 to 1000 centipoise at 25° C. and a vinyl content of up to 2.5 weight percent.

29. The article of manufacture of claim 22 wherein the organohydrogenpolysiloxane is a trimethyl chain-stopped methylhydrogenpolysiloxane fluid having a viscosity of approximately 10 to 500 centipoise at 25° C. and a hydrogen content of approximately 0.1 to 1.67 percent by weight.

30. The article of manufacture of claim 22 wherein the precious metal catalyst is selected from the group consisting of platinum metal, rhodium metal, complexes of platinum metal and complexes of rhodium metal.

31. The article of manufacture of claim 30 wherein the precious metal catalyst is present in an amount sufficient to provide approximately 5 to 500 parts of platinum or rhodium metal per million parts of base polymer.

32. The article of manufacture of claim 22 wherein the inhibitor is provided as 0.1 to 5 parts by weight Component D.

33. The article of manufacture of claim 32 wherein the inhibitor is selected from the class consisting of dialkyl carboxylic esters containing carbon to carbon unsaturation, compounds containing an acetylenic group, olefinic carboxylic acid esters of aliphatic alcohols where the aliphatic alcohol contains from 1 to 4 carbon atoms and the olefinic carboxylic acid contains from 2 to 10 carbon atoms, alkenyl isocyanurates wherein the alkenyl group contains from 3 to 8 carbon atoms, dialkylacetylenedicarboxylates, and a blend of a dialkylcarboxylic ester having carbon to carbon unsaturation with an olefinic carboxylic acid ester of an aliphatic alcohol where the aliphatic alcohol contains from 1 to 4 carbon atoms and the olefinic carboxylic acid contains from 2 to 10 carbon atoms.

34. The article of manufacture of claim 32 wherein the inhibitor is a blend of a dialkylcarboxylic ester having carbon to carbon unsaturation and an olefinic carboxylic acid ester of an aliphatic alcohol, where the aliphatic alcohol contains from 1 to 4 carbon atoms and the olefinic carboxylic acid contains from 2 to 10 carbon atoms.

35. The article of manufacture of claim 34 wherein the dialkylcarboxylic ester is selected from the group consisting of diallylmaleate, butylallylmaleate, diallylsuccinate and dialkyl esters of maleic acid selected from the group consisting of dimethylmaleate, diethylmaleate and silylmaleate.

36. The article of manufacture of claim 34 wherein the olefinic carboxylic acid ester of an aliphatic alcohol is vinyl acetate.

37. The article of manufacture of claim 34 wherein the dialkyl carboxylic ester is blended with the olefinic carboxylic acid ester of an aliphatic alcohol in a ratio of from approximately 1:24 to approximately 1:1.

38. The article of manufacture of claim 34 wherein the dialkyl carboxylic ester is blended with the olefinic carboxylic acid ester of an aliphatic alcohol in a ratio of approximately 1 to 3.

39. The article of manufacture of claim 34 wherein diallylmaleate is blended with vinyl acetate in a ratio of approximately 1 to 3.

40. The article of manufacture of claim 32 wherein there is sufficient inhibitor present in Component D so as to be present in a mixture of the components in an amount ranging from approximately 0.005 to 2 percent by weight.

41. The article of manufacture of claim 22 further comprising 0.1 to 10 parts of Component E, wherein Component E is a vinyl gum cure accelerator effective for accelerating the cure of said addition curable release coating composition and wherein said gum has an average molecular weight of approximately 200,000 to 400,000.

42. The article of manufacture of claim 41 wherein said gum is present in Component E in an amount sufficient to provide at least 0.5 weight percent gum in a mixture of the components.

*43. An article of manufacture, comprising:*

*(a) a first component which comprises an olefinorganopolysiloxane or a silanol end-stopped organopolysiloxane base polymer and an amount of precious metal or precious metal complex catalyst effective for promoting a hydrosilation cure reaction or an amount of inhibitor effective for retarding a hydrosilation cure reaction at ambient temperature but which does not interfere with such reaction at elevated temperatures, and*

*(b) a second component which comprises an organohydrogenpolysiloxane cross-linking agent and an amount of precious metal or precious metal complex catalyst effective for promoting a hydrosilation cure reaction or an amount of inhibitor effective for retarding a hydrosilation cure reaction at ambient temperature but which does not interfere with such reaction at elevated temperatures,*

*with the proviso that if said first component contains a catalyst, said second component contains an inhibitor, and if said first component contains an inhibitor, said second component contains a catalyst, and wherein said first and second components are contained separate from one another.*

*44. An article of manufacture, comprising:*

*(a) a first component which comprises an olefinorganopolysiloxane or a silanol end-stopped organopolysiloxane base polymer and an amount of precious metal or precious metal complex catalyst effective for promoting a hydrosilation cure reaction, and*

*(b) a second component which comprises an organohydrogenpolysiloxane cross-linking agent and an amount of inhibitor effective for retarding a hydrosilation cure reaction at ambient temperature but which does not interfere with such reaction at elevated temperatures,*

*wherein said first and second components are contained separate from one another.*

*45. An article of manufacture, comprising:*

*(a) a first component which comprises an olefinorganopolysiloxane or a silanol end-stopped organopolysiloxane base polymer and an amount of precious metal or precious metal complex catalyst effective for promoting a hydrosilation cure reaction,*

*(b) a second component which comprises an organohydrogenpolysiloxane cross-linking agent, and*

*(c) a third component which comprises an inhibitor effective for retarding a hydrosilation cure reaction at ambient temperature but which does not interfere with such reaction at elevated temperatures,*

*wherein said first, second and third components are contained separate from one another.*

*46. An article of manufacture, comprising:*

*(a) a first component which comprises an olefinorganopolysiloxane or a silanol end-stopped organopolysiloxane or a silanol end-stopped organopolysiloxane base polymer,*

*(b) a second component which comprises an organohydrogenpolysiloxane cross-linking agent and an amount of precious metal or precious metal complex catalyst effective for promoting a hydrosilation cure reaction, and*

*(c) a third component which comprises an inhibitor effective for retarding a hydrosilation cure reaction at ambient temperature but which does not interfere with such reaction at elevated temperatures,*

*wherein said first, second and third components are contained separate from one another.*

*47. An article of manufacture, comprising:*

*(a) a first component which comprises an olefinorganopolysiloxane or a silanol end-stopped organopolysiloxane base polymer and an amount of inhibitor effective for retarding a hydrosilation cure reaction at ambient temperature but which does not interfere with such reaction at elevated temperatures,*

*(b) a second component which comprises an organohydrogenpolysiloxane cross-linking agent, and*

*(c) a third component which comprises a precious metal or precious metal complex catalyst effective for promoting a hydrosilation cure reaction,*

*wherein said first, second and third components are contained separate from one another.*

*48. An article of manufacture, comprising:*

*(a) a first component which comprises an olefinorganopolysiloxane or a silanol end-stopped organopolysiloxane base polymer,*

*(b) a second component which comprises an organohydrogenpolysiloxane cross-linking agent and an amount of inhibitor effective for retarding a hydrosilation cure reaction at ambient temperature but which does not interfere with such reaction at elevated temperatures, and*

*(c) a third component which comprises a precious metal or precious metal complex catalyst effective for promoting a hydrosilation cure reaction,*

*wherein said first, second, and third components are contained separate from one another.*

*49. An article of manufacture, comprising:*

(a) a first component which comprises an olefinorganopolysiloxane or a silanol end-stopped organopolysiloxane base polymer, (b) a second component which comprises an organohydrogenpolysiloxane cross-linking agent, (c) a third component which comprises a precious metal or precious metal complex catalyst effective for promoting a hydrosilation cure reaction, and (d) a fourth component which comprises an inhibitor effective for retarding a hydrosilation cure reaction at ambient temperature but which does not interfere with such reaction at elevated temperatures, wherein said first, second, third and fourth components are contained separate from one another.

50. A process for providing a substrate having a silicone release coating composition cured thereon, comprising:

(I) mixing:

(a) a first component which comprises an olefinorganopolysiloxane or a silanol end-stopped organopolysiloxane base polymer and an amount of precious metal or precious metal complex catalyst effective for promoting a hydrosilation cure reaction or an amount of inhibitor effective for retarding a hydrosilation cure reaction at ambient temperature but which does not interfere with such reaction at elevated temperatures, and (b) a second component which comprises an organohydrogenpolysiloxane cross-linking agent and an amount of precious metal or precious metal complex catalyst effective for promoting a hydrosilation cure reaction or an amount of inhibitor effective for retarding a hydrosilation cure reaction at ambient temperature but which does not interfere with such reaction at elevated temperatures, with the proviso that if said first component contains a catalyst, said second component contains an inhibitor, and if said first component contains an inhibitor, said second component contains a catalyst, and wherein prior to use said first and second components are contained separate from one another, (II) applying a coating of the mixture obtained from (I) to a suitable substrate, and (III) curing said coating to said substrate.

51. A process for providing a substrate having a silicone release coating composition cured thereon, comprising:

(I) mixing:

(a) a first component which comprises an olefinorganopolysiloxane or a silanol end-stopped organopolysiloxane base polymer and an amount of precious metal or precious metal complex catalyst effective for promoting a hydrosilation cure reaction or an amount of inhibitor effective for retarding a hydrosilation cure reaction at ambient temperature but which does not interfere with such reaction at elevated temperatures, and (b) a second component which comprises an organohydrogenpolysiloxane cross-linking agent an an amount of precious metal or precious metal complex catalyst effective for promoting a hydrosilation cure reaction or an amount of inhibitor effective for retarding a hydrosilation cure reaction at ambient temperature but which does not interfere with such reaction at elevated temperatures, with the proviso that if said first component contains a catalyst, said second component contains an inhibitor, and if said first component contains an inhibitor, said second component contains a catalyst, and wherein prior to use said first and second components are contained separate from one another, (II) applying a coating of the mixture obtained from (I) to a suitable substrate, and (III) curing said coating to said substrate.

52. A process for providing a substrate having a silicone release coating composition cured thereon, comprising:

(I) mixing:

(a) a first component which comprises an olefinorganopolysiloxane or a silanol end-stopped organopolysiloxane base polymer and an amount of precious metal or precious metal complex catalyst effective for promoting a hydrosilation cure reaction, (b) a second component which comprises an organohydrogenpolysiloxane cross-linking agent and (c) a third component which comprises an inhibitor effective for retarding a hydrosilation cure reaction at ambient temperature but which does not interfere with such reaction at elevated temperatures, wherein prior to use said first, second and third components are contained separate from one another, (II) applying a coating of the mixture obtained from (I) to a suitable substrate, and (III) curing said coating to said substrate.

53. A process for providing a substrate having a silicone release coating composition cured thereon, comprising:

(I) mixing:

(a) a first component which comprises an olefinorganopolysiloxane or a silanol end-stopped organopolysiloxane base polymer, (b) a second component which comprises an organohydrogenpolysiloxane cross-linking agent and an amount of precious metal or precious metal complex catalyst effective for promoting a hydrosilation cure reaction, and (c) a third component which comprises an inhibitor effective for retarding a hydrosilation cure reaction at ambient temperature but which does not interfere with such reaction at elevated temperatures, wherein prior to use said first, second and third components are contained separate from one another, (II) applying a coating of the mixture obtained from (I) to a suitable substrate, and (III) curing said coating to said substrate.

54. A process for providing a substrate having a silicone release coating composition cured thereon, comprising:

(I) mixing:

(a) a first component which comprises an olefinorganopolysiloxane or a silanol end-stopped organopolysiloxane base polymer and an amount of inhibitor effective for retarding a hydrosilation cure reaction at ambient temperature but which does not interfere with such reaction at elevated temperatures, (b) a second component which comprises an organohydrogenpolysiloxane cross-linking agent, and (c) a third component which comprises a precious metal or precious metal complex catalyst effective for promoting a hydrosilation cure reaction, wherein prior to use said first, second and third components are contained separate from one another, (II) applying a coating of the mixture obtained from (I) to a suitable substrate, and (III) curing said coating to said substrate.

55. A process for providing a substrate having a silicone release coating composition cured thereon, comprising:

(I) mixing:

(a) a first component which comprises an olefinorganopolysiloxane or a silanol end-stopped organopolysiloxane base polymer, (b) a second component which comprises an organohydrogenpolysiloxane cross-linking agent, and an amount of inhibitor effective for retarding a hydrosilation cure reaction at ambient temperature but which does not interfere with such reaction at elevated temperatures, and (c) a third component which comprises a precious metal or precious metal complex catalyst effective for promoting a hydrosilation cure reaction, wherein prior to use said first, second and third components are contained separate from one another, (II) applying a coating of the mixture obtained from (I) to a suitable substrate, and (III) curing said coating to said substrate.

56. A process for providing a substrate having a silicone release coating composition cured thereon, comprising:

(I) mixing:

(a) a first component which comprises an olefinorganopolysiloxane or a silanol end-stopped organopolysiloxane base polymer, (b) a second component which comprises an organohydrogenpolysiloxane cross-linking agent, (c) a third component which comprises a precious metal or precious metal complex catalyst effective for promoting a hydrosilation cure reaction, and (d) a fourth component which comprises an inhibitor effective for retarding a hydrosilation cure reaction at ambient temperature but which does not interfere with such reaction at elevated temperatures, wherein said first, second, third and fourth components are contained separate from one another, (II) applying a coating of the mixture obtained from (I) to a suitable substrate, and (III) curing said coating to said substrate.

57. In an article of manufacture, comprising:

(a) an olefinorganopolysiloxane or a silanol end-stopped organopolysiloxane base polymer, (b) an organohydrogenpolysiloxane cross-linking agent, (c) an amount of precious metal or precious metal complex catalyst effective for promoting a hydrosilation cure reaction, and (d) an amount of inhibitor effective for retarding a hydrosilation cure reaction at ambient temperature but which does not interfere with such reaction at elevated temperatures;

the improvement comprising packaging said article of manufacture in two or more packages wherein said precious metal or precious metal complex catalyst (c) and said inhibitor (d ) are contained in separate packages.

* * * * *